(12) United States Patent
Preston et al.

(10) Patent No.: US 7,778,739 B2
(45) Date of Patent: Aug. 17, 2010

(54) METHOD AND APPARATUS FOR DYNAMIC CONFIGURATION OF MULTIPROCESSOR SYSTEM

(75) Inventors: Dan Alan Preston, Bainbridge Island, WA (US); Robert Pierce Lutter, Tacoma, WA (US)

(73) Assignee: Medius, Inc., Bainbridge Island, WA (US)

( * ) Notice: Subject to any disclaimer, the term of this patent is extended or adjusted under 35 U.S.C. 154(b) by 0 days.

(21) Appl. No.: 11/462,958

(22) Filed: Aug. 7, 2006

(65) Prior Publication Data

US 2006/0268930 A1    Nov. 30, 2006

Related U.S. Application Data

(63) Continuation of application No. 09/841,915, filed on Apr. 24, 2001, now Pat. No. 7,146,260.

(51) Int. Cl.
    *G05D 1/00* (2006.01)
(52) U.S. Cl. .............................. 701/1; 701/33
(58) Field of Classification Search .............. 701/22, 701/24, 33, 1; 712/10, 11, 16, 17; 340/825.72; 717/168–178
    See application file for complete search history.

(56) References Cited

U.S. PATENT DOCUMENTS

| | | | |
|---|---|---|---|
| 2,995,318 A | 8/1961 | Cocharo | |
| 4,303,978 A | 12/1981 | Shaw et al. | |
| 4,528,563 A | 7/1985 | Takeuchi | |
| 4,591,976 A | 5/1986 | Webber et al. | |
| 4,829,434 A | 5/1989 | Karmel et al. | |
| 4,907,159 A | 3/1990 | Mauge et al. | |
| 5,008,678 A | 4/1991 | Herman | |
| 5,031,330 A | 7/1991 | Stuart | |
| 5,045,937 A | 9/1991 | Myrick | |
| 5,111,401 A | 5/1992 | Everett, Jr. et al. | |
| 5,115,245 A | 5/1992 | Wen et al. | |

(Continued)

FOREIGN PATENT DOCUMENTS

DE       3125151       1/1983

(Continued)

OTHER PUBLICATIONS

A. Das, R. Fierro, V. Kumar, J. Ostrowski, J. Spletzer, and C. Taylor, "A Framework for Vision Based Formation Control", IEEE Transactions on Robotics and Automation, vol. XX, No. Y, 2001, pp. 1-13.

(Continued)

*Primary Examiner*—Ricky Ngo
*Assistant Examiner*—Phuongchau B Nguyen
(74) *Attorney, Agent, or Firm*—Stolowitz Ford Cowger LLP

(57) ABSTRACT

A multiprocessor system used in a car, home, or office environment includes multiple processors that run different real-time applications. A dynamic configuration system runs on the multiple processors and includes a device manager, configuration manager, and data manager. The device manager automatically detects and adds new devices to the multiprocessor system, and the configuration manager automatically reconfigures which processors run the real-time applications. The data manager identifies the type of data generated by the new devices and identifies which devices in the multiprocessor system are able to process the data.

32 Claims, 12 Drawing Sheets

U.S. PATENT DOCUMENTS

| | | | |
|---|---|---|---|
| 5,245,909 A | 9/1993 | Corrigan et al. | |
| 5,287,199 A * | 2/1994 | Zoccolillo | 379/100.07 |
| 5,303,297 A | 4/1994 | Hillis | |
| 5,339,086 A | 8/1994 | DeLuca et al. | |
| 5,341,301 A | 8/1994 | Shirai et al. | |
| 5,438,361 A | 8/1995 | Coleman | |
| 5,471,214 A | 11/1995 | Faibish et al. | |
| 5,506,963 A | 4/1996 | Ducateau et al. | |
| 5,532,706 A | 7/1996 | Reinhardt et al. | |
| 5,552,773 A | 9/1996 | Kuhnert | |
| 5,581,462 A | 12/1996 | Rogers | |
| 5,585,798 A | 12/1996 | Yoshioka et al. | |
| 5,617,085 A | 4/1997 | Tsutsumi et al. | |
| 5,646,612 A | 7/1997 | Byon | |
| 5,749,060 A | 5/1998 | Graft et al. | |
| 5,761,320 A | 6/1998 | Farinelli et al. | |
| 5,786,998 A | 7/1998 | Neeson et al. | |
| 5,794,164 A * | 8/1998 | Beckert et al. | 455/3.06 |
| 5,872,508 A | 2/1999 | Taoka | |
| 5,907,293 A | 5/1999 | Tognazzini | |
| 5,915,214 A | 6/1999 | Reece et al. | |
| 5,943,427 A | 8/1999 | Massie et al. | |
| 5,948,040 A * | 9/1999 | DeLorme et al. | 701/201 |
| 5,951,620 A * | 9/1999 | Ahrens et al. | 701/200 |
| 5,963,092 A | 10/1999 | VanZalinge | |
| 5,964,822 A | 10/1999 | Alland | |
| 5,966,658 A | 10/1999 | Kennedy et al. | |
| 5,969,598 A | 10/1999 | Kimura | |
| 5,977,906 A | 11/1999 | Ameen | |
| 5,983,092 A | 11/1999 | Whinnett et al. | |
| 5,983,161 A | 11/1999 | Lemelson et al. | |
| 6,009,330 A | 12/1999 | Kennedy et al. | |
| 6,009,403 A * | 12/1999 | Sato | 701/201 |
| 6,028,537 A | 2/2000 | Suman et al. | |
| 6,028,548 A | 2/2000 | Farmer | |
| 6,032,089 A * | 2/2000 | Buckley | 701/36 |
| 6,054,950 A | 4/2000 | Fontana | |
| 6,060,989 A | 5/2000 | Gehlot | |
| 6,061,709 A | 5/2000 | Bronte | |
| 6,075,467 A * | 6/2000 | Ninagawa | 701/212 |
| 6,097,285 A | 8/2000 | Curtin | |
| 6,128,608 A | 10/2000 | Barnhill | |
| 6,148,261 A | 11/2000 | Obradovich et al. | |
| 6,150,961 A | 11/2000 | Alewine | |
| 6,154,123 A | 11/2000 | Kleinberg | |
| 6,161,071 A * | 12/2000 | Shuman et al. | 701/48 |
| 6,163,711 A | 12/2000 | Juntunen et al. | |
| 6,166,627 A | 12/2000 | Reeley | |
| 6,167,253 A | 12/2000 | Farris et al. | |
| 6,169,894 B1 | 1/2001 | McCormick | |
| 6,175,728 B1 | 1/2001 | Mitama | |
| 6,175,782 B1 | 1/2001 | Obradovich et al. | |
| 6,181,922 B1 * | 1/2001 | Iwai et al. | 455/249.1 |
| 6,181,994 B1 | 1/2001 | Colson et al. | |
| 6,182,006 B1 * | 1/2001 | Meek | 701/200 |
| 6,202,027 B1 | 3/2001 | Alland et al. | |
| 6,203,366 B1 | 3/2001 | Muller et al. | |
| 6,204,804 B1 | 3/2001 | Andersson | |
| 6,226,389 B1 | 5/2001 | Lebelson et al. | |
| 6,240,365 B1 | 5/2001 | Bunn | |
| 6,243,450 B1 | 6/2001 | Jansen et al. | |
| 6,252,544 B1 | 6/2001 | Hoffberg | |
| 6,275,231 B1 | 8/2001 | Obradovich et al. | |
| 6,292,109 B1 | 9/2001 | Murano et al. | |
| 6,292,747 B1 * | 9/2001 | Amro et al. | 455/456.6 |
| 6,294,987 B1 | 9/2001 | Matsuda et al. | |
| 6,297,732 B2 | 10/2001 | Hsu et al. | |
| 6,298,302 B2 | 10/2001 | Walgers et al. | |
| 6,326,903 B1 | 12/2001 | Gross et al. | |
| 6,327,536 B1 | 12/2001 | Tsuji et al. | |
| 6,362,748 B1 * | 3/2002 | Huang | 455/459 |
| 6,374,286 B1 | 4/2002 | Gee et al. | |
| 6,377,860 B1 * | 4/2002 | Gray et al. | 701/36 |
| 6,389,340 B1 | 5/2002 | Rayner | |
| 6,405,132 B1 | 6/2002 | Breed et al. | |
| 6,408,174 B1 | 6/2002 | Steijer | |
| 6,417,782 B1 | 7/2002 | Darnall | |
| 6,421,429 B1 * | 7/2002 | Merritt et al. | 379/93.17 |
| 6,429,789 B1 | 8/2002 | Kiridena et al. | |
| 6,429,812 B1 | 8/2002 | Hoffberg | |
| 6,445,308 B1 | 9/2002 | Koike | |
| 6,452,484 B1 | 9/2002 | Drori | |
| 6,484,080 B2 | 11/2002 | Breed | |
| 6,496,689 B1 | 12/2002 | Keller et al. | |
| 6,505,100 B1 | 1/2003 | Stuempfle et al. | |
| 6,515,595 B1 | 2/2003 | Obradovich et al. | |
| 6,522,875 B1 | 2/2003 | Dowling et al. | |
| 6,559,773 B1 * | 5/2003 | Berry | 340/815.4 |
| 6,615,137 B2 | 9/2003 | Lutter | |
| 6,616,071 B2 | 9/2003 | Kitamura | |
| 6,622,083 B1 * | 9/2003 | Knockeart et al. | 709/203 |
| 6,629,033 B2 | 9/2003 | Preston | |
| 6,647,270 B1 | 11/2003 | Himmelstein | |
| 6,707,421 B1 * | 3/2004 | Drury et al. | 701/208 |
| 6,734,799 B2 | 5/2004 | Munch | |
| 6,778,073 B2 | 8/2004 | Lutter | |
| 6,778,924 B2 | 8/2004 | Hanse | |
| 6,782,315 B2 | 8/2004 | Lu et al. | |
| 6,785,551 B1 | 8/2004 | Richard | |
| 6,792,351 B2 | 9/2004 | Lutter | |
| 6,901,057 B2 | 5/2005 | Rune | |
| 6,925,368 B2 * | 8/2005 | Funkhouser et al. | 701/33 |
| 6,973,030 B2 * | 12/2005 | Pecen et al. | 370/229 |
| 7,006,950 B1 | 2/2006 | Greiffenhagen et al. | |
| 7,024,363 B1 * | 4/2006 | Comerford et al. | 704/270 |
| 7,079,993 B2 | 7/2006 | Stephenson et al. | |
| 7,120,129 B2 | 10/2006 | Ayyagari et al. | |
| 7,146,260 B2 | 12/2006 | Preston | |
| 7,187,947 B1 | 3/2007 | White et al. | |
| 7,249,266 B2 * | 7/2007 | Margalit et al. | 713/193 |
| 7,257,426 B1 * | 8/2007 | Witkowski et al. | 455/569.2 |
| 7,274,988 B2 | 9/2007 | Mukaiyama | |
| 7,343,160 B2 | 3/2008 | Morton | |
| 7,375,728 B2 | 5/2008 | Donath | |
| 7,379,707 B2 | 5/2008 | DiFonzo | |
| 2001/0008992 A1 | 7/2001 | Saito et al. | |
| 2001/0009855 A1 | 7/2001 | L'Anson | |
| 2001/0018639 A1 | 8/2001 | Bunn | |
| 2001/0022927 A1 | 9/2001 | Mattio et al. | |
| 2001/0041556 A1 | 11/2001 | Laursen et al. | |
| 2001/0048749 A1 * | 12/2001 | Ohmura et al. | 455/345 |
| 2001/0051853 A1 | 12/2001 | Evans et al. | |
| 2002/0012329 A1 | 1/2002 | Atkinson et al. | |
| 2002/0087886 A1 | 7/2002 | Ellis | |
| 2002/0119766 A1 | 8/2002 | Bianconi et al. | |
| 2002/0142759 A1 * | 10/2002 | Newell et al. | 455/414 |
| 2002/0144010 A1 | 10/2002 | Younis et al. | |
| 2002/0177429 A1 | 11/2002 | Watler et al. | |
| 2002/0198925 A1 | 12/2002 | Smith et al. | |
| 2003/0004633 A1 | 1/2003 | Russell et al. | |
| 2003/0009270 A1 | 1/2003 | Breed | |
| 2003/0011509 A1 | 1/2003 | Honda | |
| 2003/0060188 A1 | 3/2003 | Gidron et al. | |
| 2003/0065432 A1 | 4/2003 | Shuman et al. | |
| 2003/0110113 A1 | 6/2003 | Martin | |
| 2003/0201365 A1 | 10/2003 | Nelson | |
| 2003/0201929 A1 | 10/2003 | Lutter et al. | |
| 2004/0149036 A1 | 8/2004 | Foxlin et al. | |
| 2004/0164228 A1 | 8/2004 | Fogg et al. | |
| 2005/0009506 A1 | 1/2005 | Smolentzov | |
| 2005/0070221 A1 | 3/2005 | Upton | |
| 2005/0080543 A1 | 4/2005 | Lu et al. | |
| 2005/0130656 A1 | 6/2005 | Chen | |
| 2005/0153654 A1 | 7/2005 | Anderson | |

| | | | |
|---|---|---|---|
| 2005/0240672 | A1* | 10/2005 | Chen et al. .................. 709/229 |
| 2005/0260984 | A1 | 11/2005 | Karabinis |
| 2007/0083597 | A1* | 4/2007 | Salesky et al. .............. 709/204 |
| 2007/0115868 | A1 | 5/2007 | Chen |
| 2007/0115897 | A1 | 5/2007 | Chen et al. |

FOREIGN PATENT DOCUMENTS

| | | |
|---|---|---|
| DE | 3125161 | 1/1983 |
| EP | 0441576 | 8/1991 |
| EP | 1355128 | 10/2003 |
| JP | 2000207691 | 7/2000 |
| WO | 9624229 | 8/1996 |
| WO | 9908436 | 2/1999 |
| WO | 9957662 | 11/1999 |
| WO | 9965183 | 12/1999 |
| WO | 0040038 | 7/2000 |
| WO | 0130061 | 4/2001 |
| WO | 0158110 | 8/2001 |

OTHER PUBLICATIONS

Ada 95 Transition Support—Lessons Learned, Sections 3, 4, and 5, CACI, Inc. -Federal, Nov. 15, 1996, 14 pages.

Boeing News Release, "Boeing Demonstrates JSF Avionics Multi-Sensor Fusion", Seattle, WA, May 9, 2000, pp. 1-2.

Boeing Statement, "Chairman and CEO Phil Condit on the JSF Decision", Washington, D.C., Oct. 26, 2001, pp. 1-2.

Bluetooth Specification version 1.1: Feb. 22, 2001.

Counterair: The Cutting Edge, Ch. 2 "The Evolutionary Trajectory The Fighter Pilot—Here to Stay?" AF2025 v3c8-2, Dec. 1996, pp. 1-7.

Counterair: The Cutting Edge, Ch. 4 "The Virtual Trajectory Air Superiority without an "Air" Force?" AF2025 v3c8-4, Dec. 1996, pp. 1-12.

Green Hills Software, Inc., "The AdaMULTI 2000 Integrated Development Environment," Copyright 2002, 7 pages.

Hitachi Automated Highway System (AHS), Automotive Products, Hitachi, Ltd., Copyright 1994-2002, 8 pages.

J. Takezaki, N. Ueki, T. Minowa, H. Kondoh, "Support System for Safe Driving—A Step Toward ITS Autonomous Driving—", Hitachi Review, vol. 49, No. 3, 2000, pp. 1-8.

Joint Strike Fighter Terrain Database, ets-news.com "Simulator Solutions" 2002, 3 pages.

Luttge, Karsten; "E-Charging API: Outsource Charging to a Payment Service Provider"; IEEE; 2001 (pp. 216-222).

Powerpoint Presentation by Robert Allen—Boeing Phantom Works entitled "Real-Time Embedded Avionics System Security and COTS Operating Systems", Open Group Real-Time Forum, Jul. 18, 2001, 16 pages.

Product description of Raytheon Electronic Systems (ES), Copyright 2002, pp. 1-2.

Product description of Raytheon RT Secure, "Development Environment", Copyright 2001, pp. 1-2.

Product description of Raytheon RT Secure, "Embedded Hard Real-Time Secure Operating System", Copyright 2000, pp. 1-2.

Product description of Raytheon RT Secure, Copyright 2001, pp. 1-2.

S.G. Goodridge, "Multimedia Sensor Fusion for Intelligent Camera Control and Human-Computer Interaction", Dissertation submitted to the Graduate Faculty of North Carolina State University in partial fulfillment of the requirements for the degree of Doctor of Philosophy in Electrical Engineering, Raleigh, NC, 1997, pp. 1-5.

TNO FEL Annual Review 1998: Quality works, 16 pages.

AMIC. Architecture specification release 1, 2001.

Specification of the Bluetooth System v1.0.B Dec. 1, 1999.

Specification of the Bluetooth System v1.1 Feb. 22, 2001.

MyGig.

Embedded Bluetooth Lisbon-Seattle Jan. 23, 2008.

Bluetooth hands-free profile 1.5—Nov. 25, 2005.

Bluetooth advance audio distribution profile specification—May 22, 2003.

Bluetooth audio/video remote control profile—May 22, 2003.

IEEE Standard for Information Technology—POSIX Based Supercomputing Application Environment Profile; Jun. 14, 1995, 72 pages.

* cited by examiner

METHOD AND APPARATUS FOR DYNAMIC CONFIGURATION OF MULTIPROCESSOR SYSTEM

This application is a continuation of Ser. No. 09/841,915 filed Apr. 24, 2001 now U.S. Pat. No. 7,146,260, the disclosure of which is incorporated herein by reference in its entirety.

BACKGROUND

Cars include many different electro-mechanical and electronic applications. Examples include braking systems, electronic security systems, radios, Compact Disc (CD) players, internal and external lighting systems, temperature control systems, locking systems, seat adjustment systems, speed control systems, mirror adjustment systems, directional indicators, etc. Generally the processors that control these different car systems do not talk to each other. For example, the car radio does not communicate with the car heating system or the car braking system. This means that each one of these car systems operate independently and do not talk to the other car systems. For example, separate processors and separate user interfaces are required for the car temperature control system and for the car audio system. Many of these different car processors may be underutilized since they are only used intermittently.

Even when multiple processors in the car do talk to each other, they are usually so tightly coupled together that it is impossible to change any one of these processors without disrupting all of the systems that are linked together. For example, some cars may have a dashboard interface that controls both internal car temperature and a car radio. The car radio cannot be replaced with a different model and still work with the dashboard interface and the car temperature controller.

Integration of new systems into a car is also limited. Car systems are designed and selected well before the car is ever built. A custom wiring harness is then designed to connect only those car systems selected for the car. A car owner cannot incorporate new systems into the existing car. For example, a car may not originally come with a navigation system. An after market navigation system from another manufacturer cannot be integrated into the existing car.

Because after market devices can not be integrated into car control and interface systems, it is often difficult for the driver to try and operate these after market devices. For example, the car driver has to operate the after market navigation system from a completely new interface, such as the keyboard and screen of a laptop computer. The driver then has to operate the laptop computer not from the front dashboard of the car, but from the passenger seat of the car. This makes many after market devices both difficult and dangerous to operate while driving.

The present invention addresses this and other problems associated with the prior art.

SUMMARY OF THE INVENTION

A multiprocessor system used in a car, home, or office environment includes multiple processors that run different real-time applications. A dynamic configuration system runs on the multiple processors and includes a device manager, configuration manager, and data manager. The device manager automatically detects and adds new devices to the multiprocessor system, and the configuration manager automatically reconfigures which processors run the real-time applications. The data manager identifies the type of data generated by the new devices and identifies which devices in the multiprocessor system are able to process the data.

DETAILED DESCRIPTION

Figure 1:
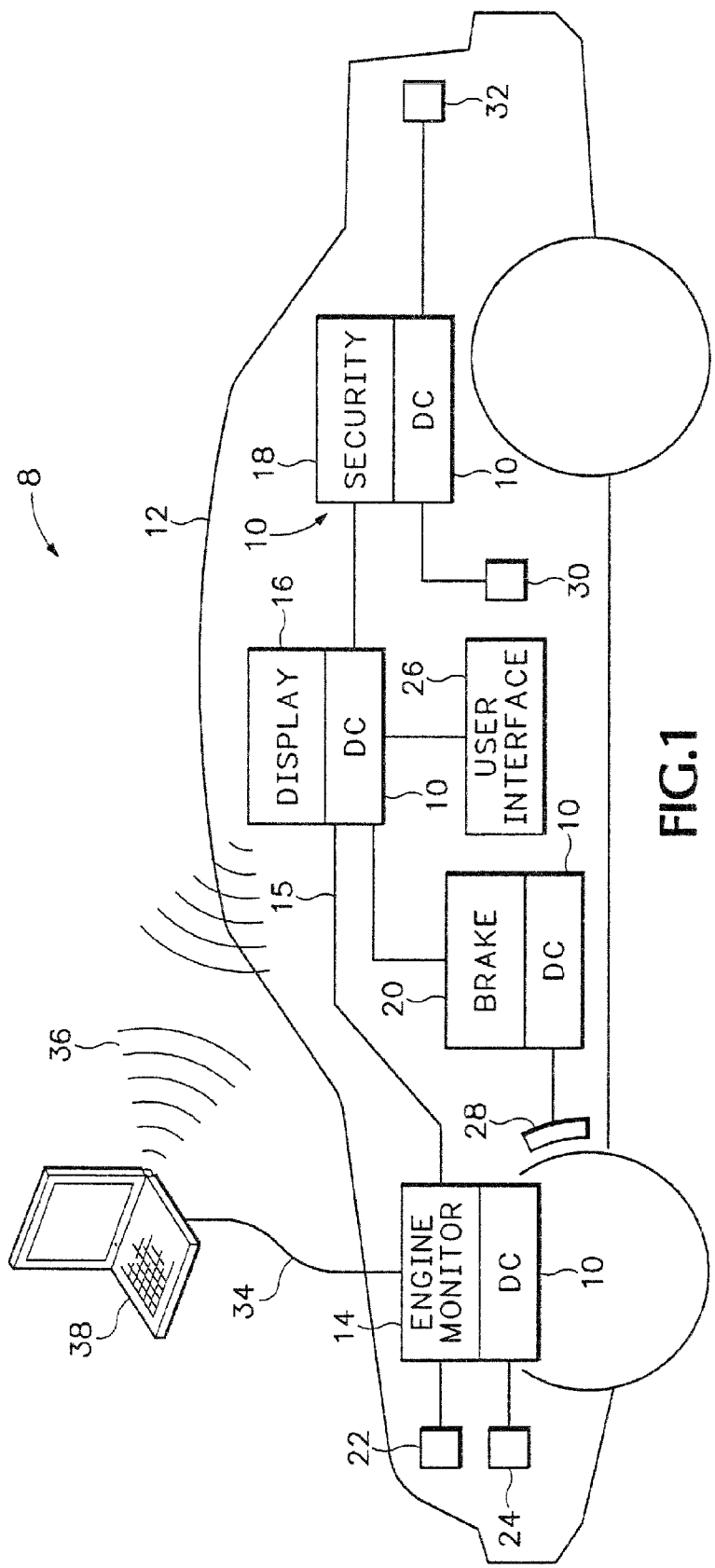
FIG. 1 is a diagram of a car that has multiple processors that each run a Dynamic Configuration (DC) system.

FIG. 1 shows a car 12 that includes a car multiprocessor system 8 having multiple processors 14, 16, 18 and 20. An engine monitor processor 14 monitors data from different sensors 22 and 24 in the car engine. The sensors 22 and 24 can be any sensing device such as sensors that monitor water temperature, oil temperature, fuel consumption, car speed, etc. A brake control processor 20 monitors and controls an Automatic Braking System (ABS) 28. A display processor 16 is used to control and monitor a graphical user interface 26. A security processor 18 monitors and controls latches and sensors 30 and 32 that are used in a car security system.

The processors 14, 16, 18 and 20 all include software that run a Dynamic Configuration (DC) system 10 that enables new processors or devices to be automatically added and removed from the car multiprocessor system 8. The DC system 10 also automatically reconfigures the applications running on different processors according to application failures and other system processing requirements.

For example, the processor 20 may currently be running a high priority brake control application. If the processor 20 fails, the DC system 10 can automatically download the braking application to another processor in car 12. The DC system 10 automatically identifies another processor with capacity to run the braking control application currently running in processor 20. The DC system 10 then automatically downloads a copy of the braking control application to the identified processor. If there is no extra reserve processing resources available, the DC system 10 may replace a non-critical application running on another processor. For example, the DC system 10 may cause the display processor 16 to terminate a current non-critical application and then download the brake control application along with any stored critical data.

The DC system 10 also automatically incorporates new processors or applications into the multiprocessor system 8. For example, a laptop computer 38 can communicate with the engine monitor processor 34 through a hardwired link 34 or communicate to the display processor 16 through a wireless link 36. The DC system 10 automatically integrates the laptop computer 38, or any other processor or device, into the multiprocessor system 8. After integrated into the multiprocessor system 8, not only can the laptop computer 38 transfer data with other processors, but the laptop computer may also run car applications normally run by other processors in car 12.

The DC system 10 allows the car driver to manage how different applications are processed in the car 12. As described above, a car operator may have to run an aftermarket navigation system through a GPS transceiver attached to the laptop computer 38. The car driver has to place the laptop computer 38 in the passengers seat and then operate the laptop computer 38 while driving.

The DC system 10 in the display computer 16 can automatically detect the navigation application running on the laptop computer 38. The display computer 16 notifies the car operator through the user interface 26 that the navigation application has been detected. The car operator can then control the navigation application through the user interface 26. Since the user interface 26 is located in the dashboard of car 12, the car operator no longer has to take his eyes off the road while operating the navigation application.

The description below gives only a few examples of the different processors, devices and applications that can be implemented using the DC system 10. Any single or multiprocessor system located either inside or outside of car 12 can communicate and exchange data using the OC system 10. It should also be understood that the DC system 10 can be used in any real-time environment such as between processors in different home or office appliances and different home and office computers.

Figure 2:
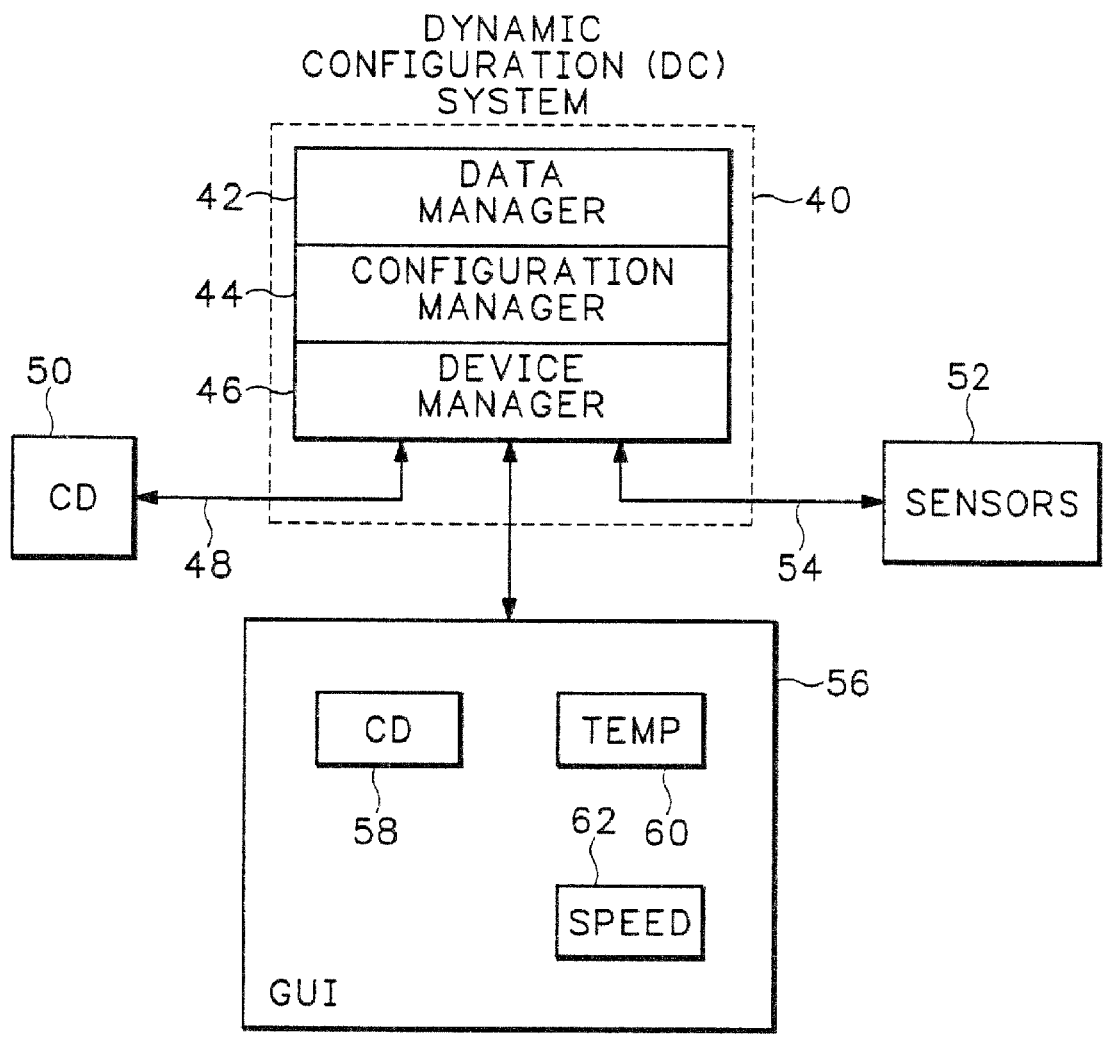
FIG. 2 is a detailed diagram of the dynamic configuration system shown in FIG. 1.

FIG. 2 is a block diagram showing in more detail the Dynamic Control (DC) system 10 located in a processor 40 that makes up part of the multiprocessor system 8 in car 12 (FIG. 1). The DC system 10 includes a device manager 46 that establishes communications with new devices that are to be incorporated into the multiprocessor system 8. A configuration manager 44 in the processor 40 dynamically moves applications between different processors according to user inputs and other monitored conditions in the multiprocessor system 8. A data manager 42 identifies a type of data input or output by a new processor and identifies other processors or devices in the multiprocessor system that can output data from the new device or input data to the new device.

In one example, sensors 52 feed sensor data to processor 40. The sensor data may include engine-monitoring data such as speed, oil temperature, water temperature, temperature inside the car cab, door open/shut conditions, etc. The sensors 52 are coupled to processor 40 through a link 54, such as a proprietary bus. A Compact Disc (CD) player 50 is coupled to the processor 40 through another link 48, such as a Universal Serial Bus (USB). Graphical User Interface (GUI) 56 displays the data associated with sensors 52 and CD player 50. The GUI 56 displays the outputs from sensors 52 using an icon 60 to identify temperature data and an icon 62 to identify car speed. The processor displays the CD player 50 as icon 62.

Figure 3:
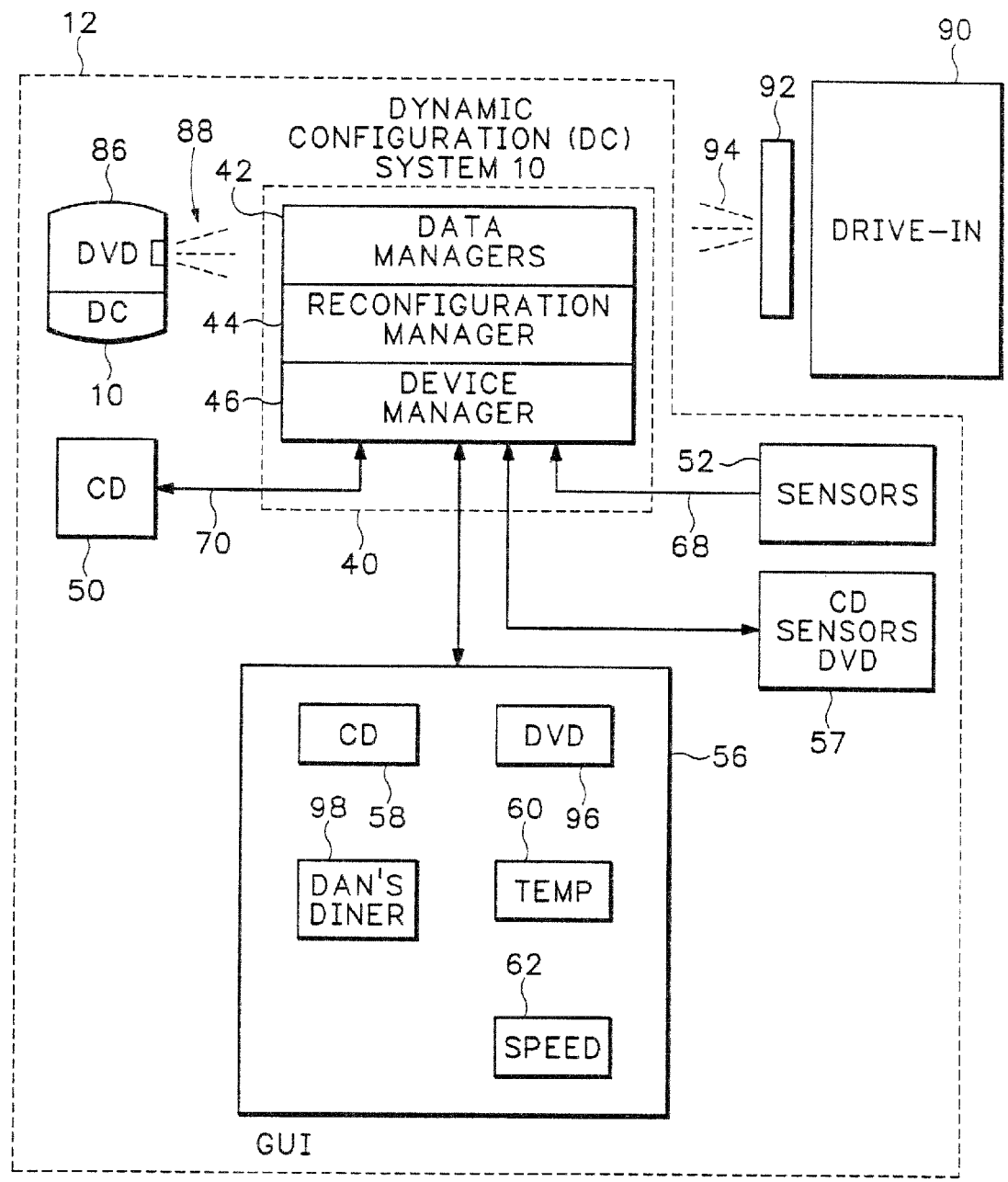
FIGS. 3 and 4 are diagrams showing an example of how the DC system operates.
Figure 4:
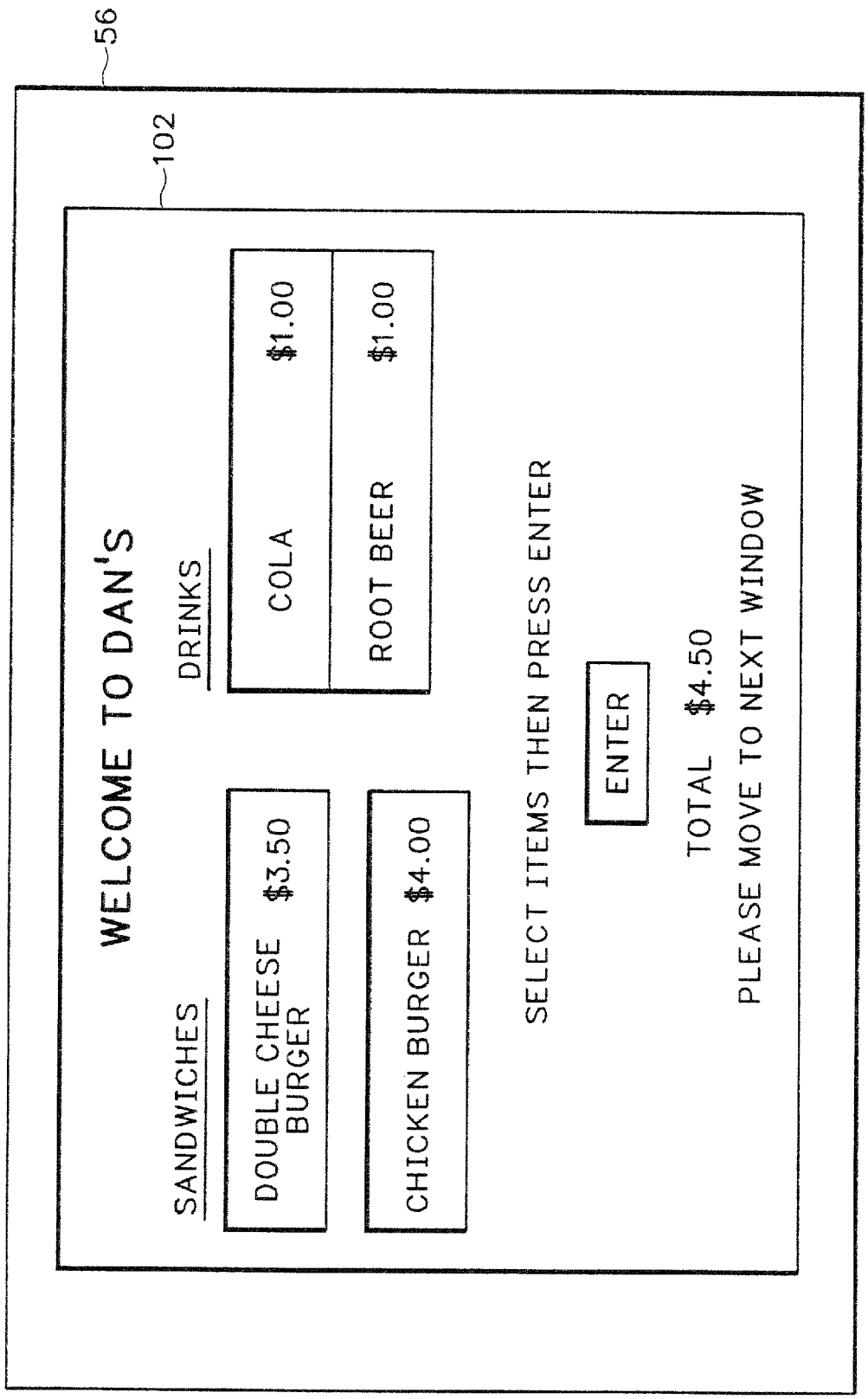

FIGS. 3 and 4 show an example of how two new applications are dynamically added to the multiprocessor system 8 in car 12 (FIG. 1). In FIG. 2, the DC system 10 in processor 40 previously detected a CD player 50 and some sensors 56. The CD player 50 was displayed on GUI 56 as icon 58 and the temperature and speed data from sensors 56 were displayed on GUI 56 as icons 60 and 62, respectfully.

The processor 40 is located in car 12 (FIG. 1). A passenger may bring a Digital Video Disc (DVD) player 86 into the car 12. The DVD 86 sends out a wireless or wired signal 88 to the processor 40. For example, the DVD 86 may send out signals using a IEEE 802.11 wireless protocol. The processor 40 includes an IEEE 802.11 interface that reads the signals 88 from DVD player 86. If the 802.11 protocol is identified as one of the protocols used by processor 40, the DC system 10 incorporates the DVD player 86 into a processor array 57 that lists different recognized applications.

The DC system 10 then automatically displays the newly detected DVD player 86 on GUI 56 as icon 96. If capable, the car operator by selecting the icon 96 can then display a video stream output from the DVD player 86 over GUI 56. The DVD player 86 can now be controlled from the GUI 56 on the car dashboard. This prevents the car driver from having to divert his eyes from the road while trying to operate the portable DVD player 86 from another location in the car, such as from the passenger seat.

Other processors or devices can also be incorporated into the multiprocessor system 8 in car 12. In another example, the car 12 drives up to a drive-in restaurant 90. The drive-in 90 includes a transmitter 92 that sends out a wireless Blue tooth signal 94. The processor 40 includes a Blue tooth transceiver that allows communication with transmitter 92. The DC system 10 recognizes the signals 94 from transmitter 92 and then incorporates the drive-in 90 into the multiprocessor system 8 (FIG. 1). The DC system 10 then displays the drive-in 90 as icon 98 in GUI 56.

Referring to FIG. 4, when the car operator selects the icon 98, a menu 102 for the driver-in 90 is displayed on the GUI 56. The car operator can then select any of the items displayed on the electronic menu 102. The selections made by the car operator are sent back to the transceiver 92 (FIG. 3). The amount of the order is calculated and sent back to the processor 40 and displayed on menu 102. Other messages, such as a direction for the car operator to move to the next window and pickup the order can also be displayed on the GUI 56. At the same time, the drive-in transceiver 92 (FIG. 3) may send audio signals that are received by the processor 40 and played out over speakers in car 12.

Figure 5:
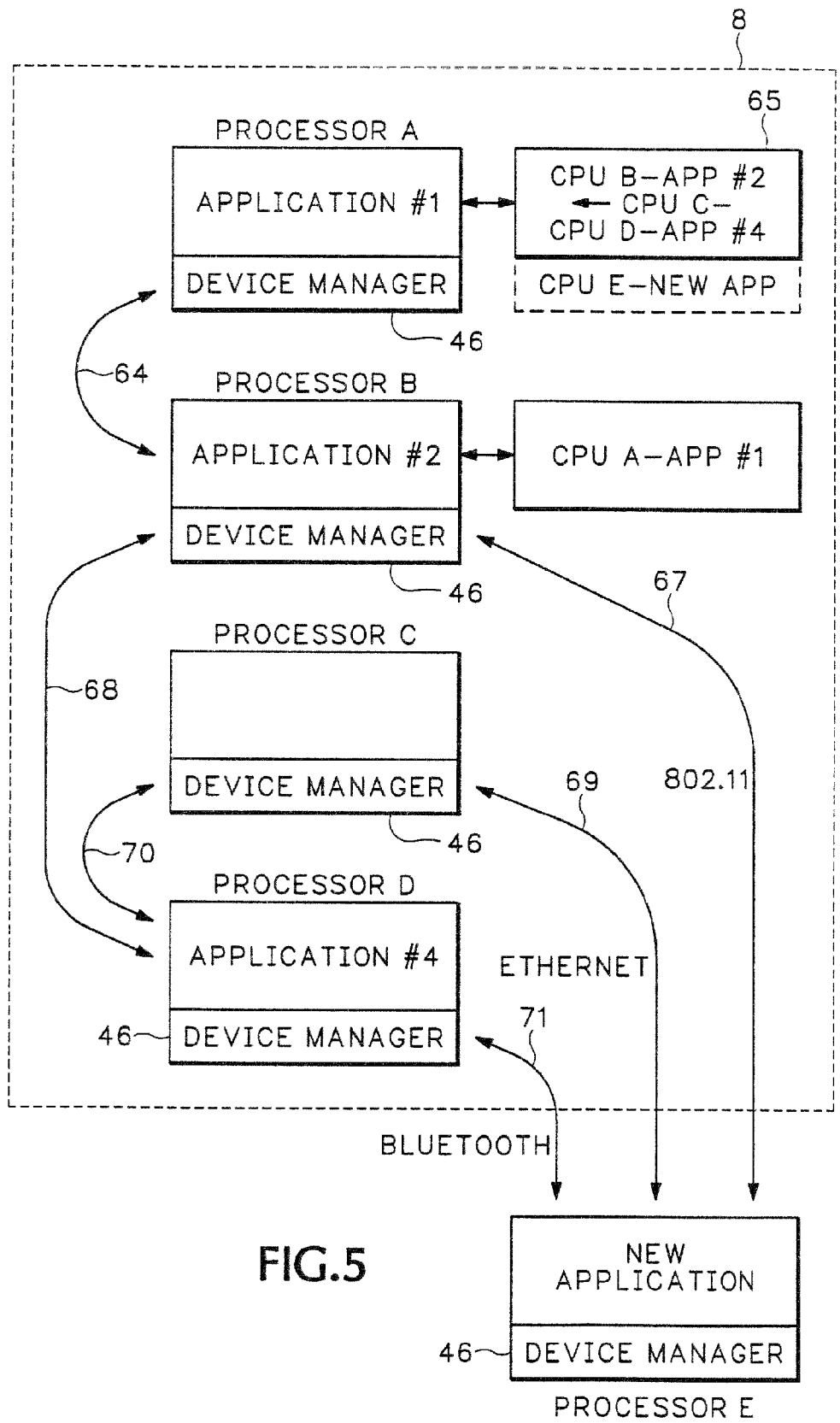
FIGS. 5 and 6 are diagrams showing how a device manager in the DC system operates.

FIG. 5 shows in more detail the operation of the device manager 46 previously shown in FIG. 2. Multiple processors A, B, C and D all include device managers 46. The device managers 46 can each identify other devices in the multiprocessor system that it communicates with. For example, processors A, B, C and D communicate to each other over one or more communication links including a Ethernet link 64, a wireless 802.11 link 68, or a blue tooth link 70.

Processor A includes a memory 65 that stores the other recognized processors B, C and D. The data managers 46 also identify any applications that may be running on the identified processors. For example, memory 65 for processor A identifies an application #2 running on processor B, no applications running on processor C, and an application #4 running on processor D.

Figure 6:
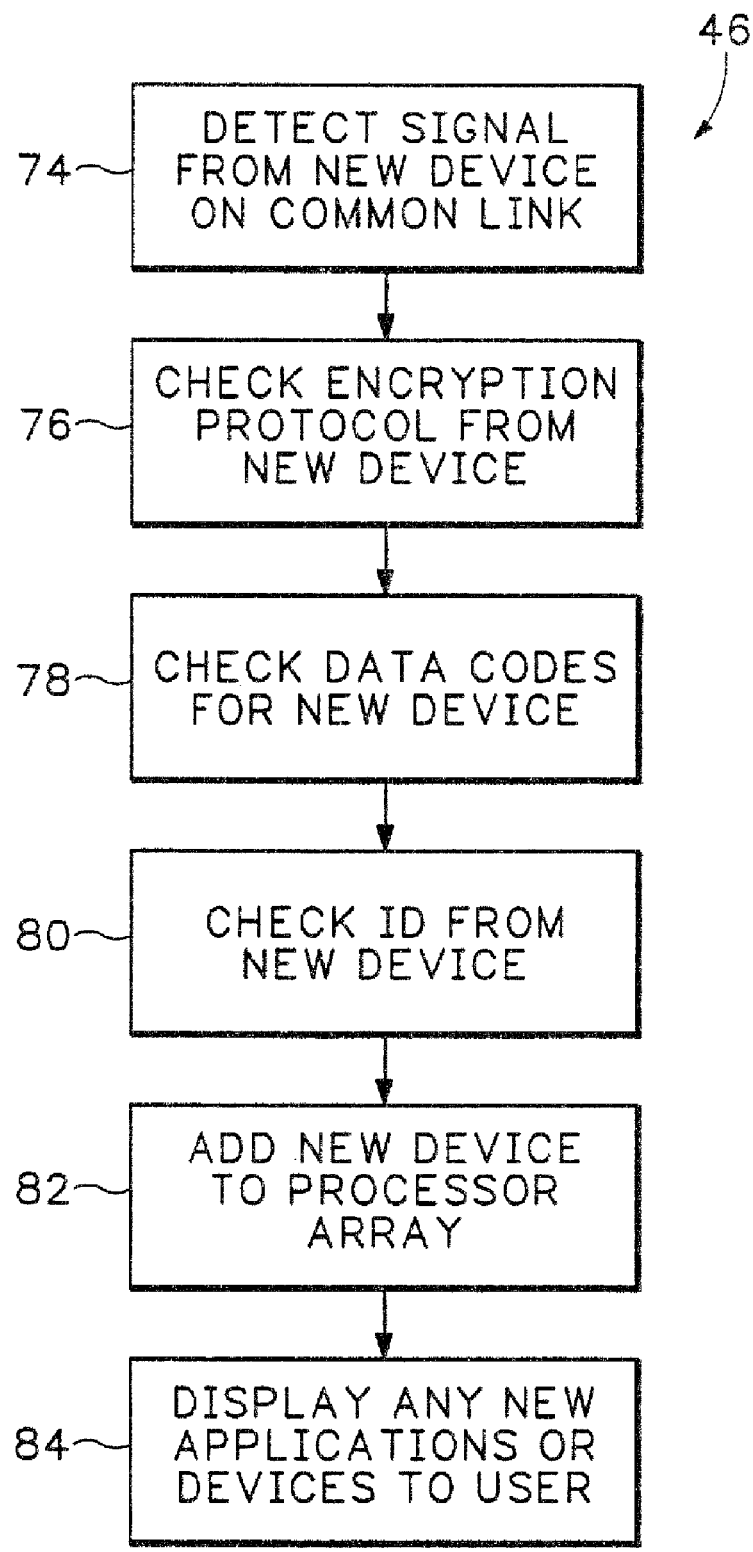

FIGS. 5 and 6 show how a new device is added to the multiprocessor system 8. Each of the existing processors A, B, C, and D after power-up are configured to identify a set or subset of the processors in the multiprocessor system 8. A new device 72 is brought into the multiprocessor system 8 either via a hardwired link or a wireless link. For example, the device E may send out signals over any one or more of a 802.11 wireless link 67, Blue tooth wireless link 71 or send out signals over a hardwired Ethernet link 69. Depending on what communication protocol is used to send signals, one or more of the processors A, B, C or D using a similar communication protocol detect the processor E in block 74 (FIG. 6). All of the processors may be connected to the same fiber optic or packet switched network that is then used to communicate the information from processor E to the other processors.

One of the device managers 46 in the multiprocessor system 8 checks the signals from processor E checks to determine if the signals are encrypted in a recognizable protocol in block 76. The device manager in the processor receiving the signals from processor E then checks for any data codes from the new device signals in block 76. The data codes identify data types used in one or more applications by processor E. A device ID for processor E is then determined from the output signals in block 80.

If all these data parameters are verified, the device managers 46 in one or more of the processors A, B, C and D add the new processor E to their processor arrays in block 82. For example, processor A adds processor E to the processor array in memory 65. After being incorporated into the multiprocessor system 8, the processor E or the applications running on the processor E may be displayed on a graphical user interface in block 84.

Figure 7:
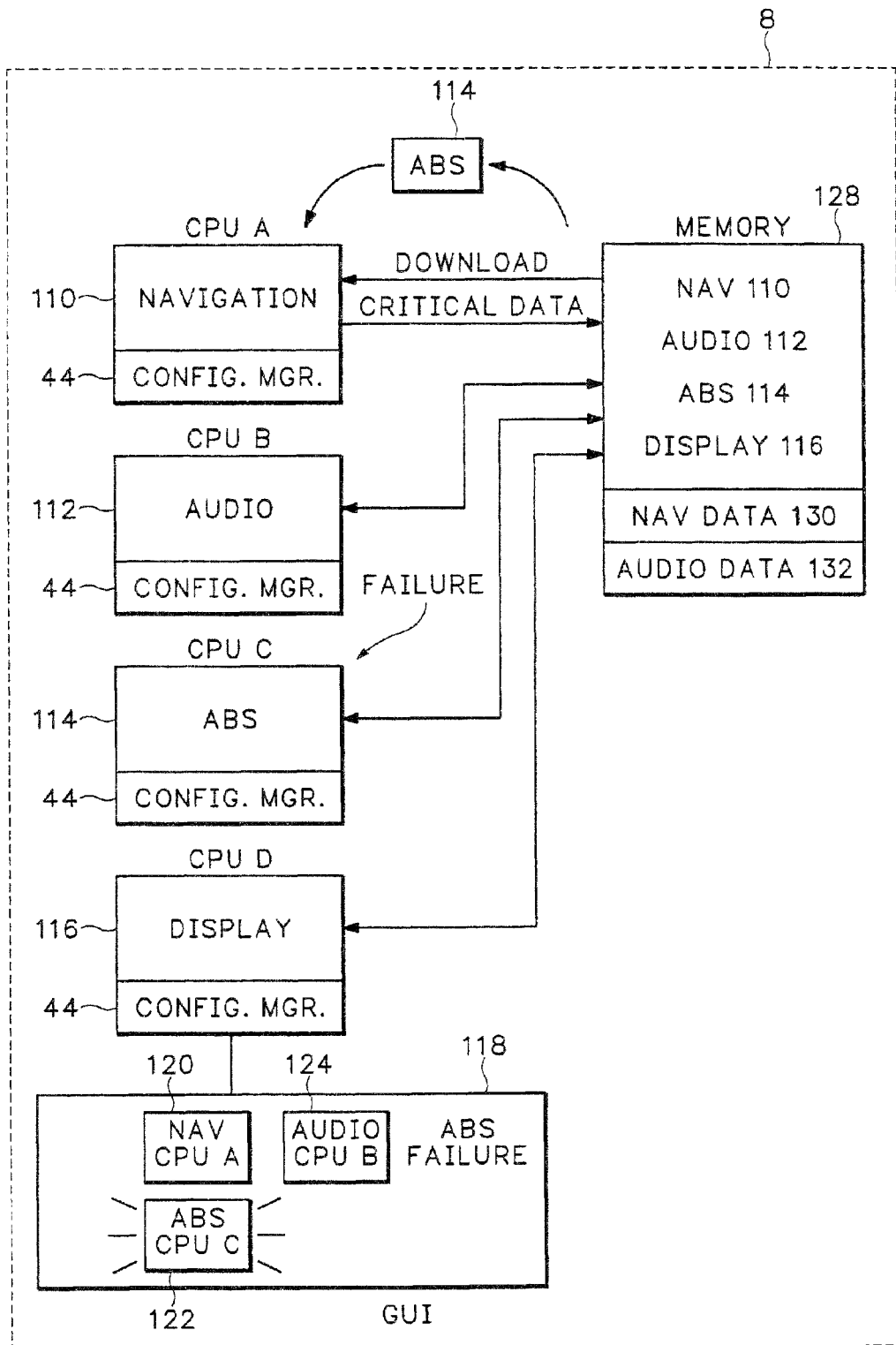
FIGS. 7-10 are diagrams showing how a reconfiguration manager in the DC system operates.

FIG. 7 describes in further detail the operation of the reconfiguration manager 44 previously described in FIG. 2. In the car multiprocessor system 8 there are four processors A, B, C and D. Of course there may be more than four processors running at the same time in the car but only four are shown in FIG. 7 for illustrative purposes. The processor A currently is operating a navigation application 110 that uses a Global Positioning System (GPS) to identify car location. Processor B currently runs an audio application 112 that controls a car radio and CD player. The processor C runs a car Automatic Braking System (ABS) application 114 and the processor D runs a display application 116 that outputs information to the car operator through a GUI 118.

The processor D displays an icon 120 on GUI 118 that represents the navigation system 110 running in processor A. An icon 124 represents the audio application running in processor B and an icon 122 represents the ABS application 114 running in processor C.

The memory 128 stores copies of the navigation application 110, audio application 112, ABS application 114 and display application 116. The memory 128 can also store data associated with the different applications. For example, navigation data 130 and audio data 132 are also stored in memory 128. The navigation data 130 may consist of the last several minutes of tracking data obtained by the navigation application 110. The audio data 132 may include the latest audio tracks played by the audio application 112.

The memory 128 can be any CD, hard disk, Read Only Memory (ROM), Dynamic Random Access (RAM) memory, etc. or any combination of different memory devices. The memory 128 can include a central memory that all or some of the processors can access and may also include different local memories that are accessed locally by specific processors.

Figure 8:
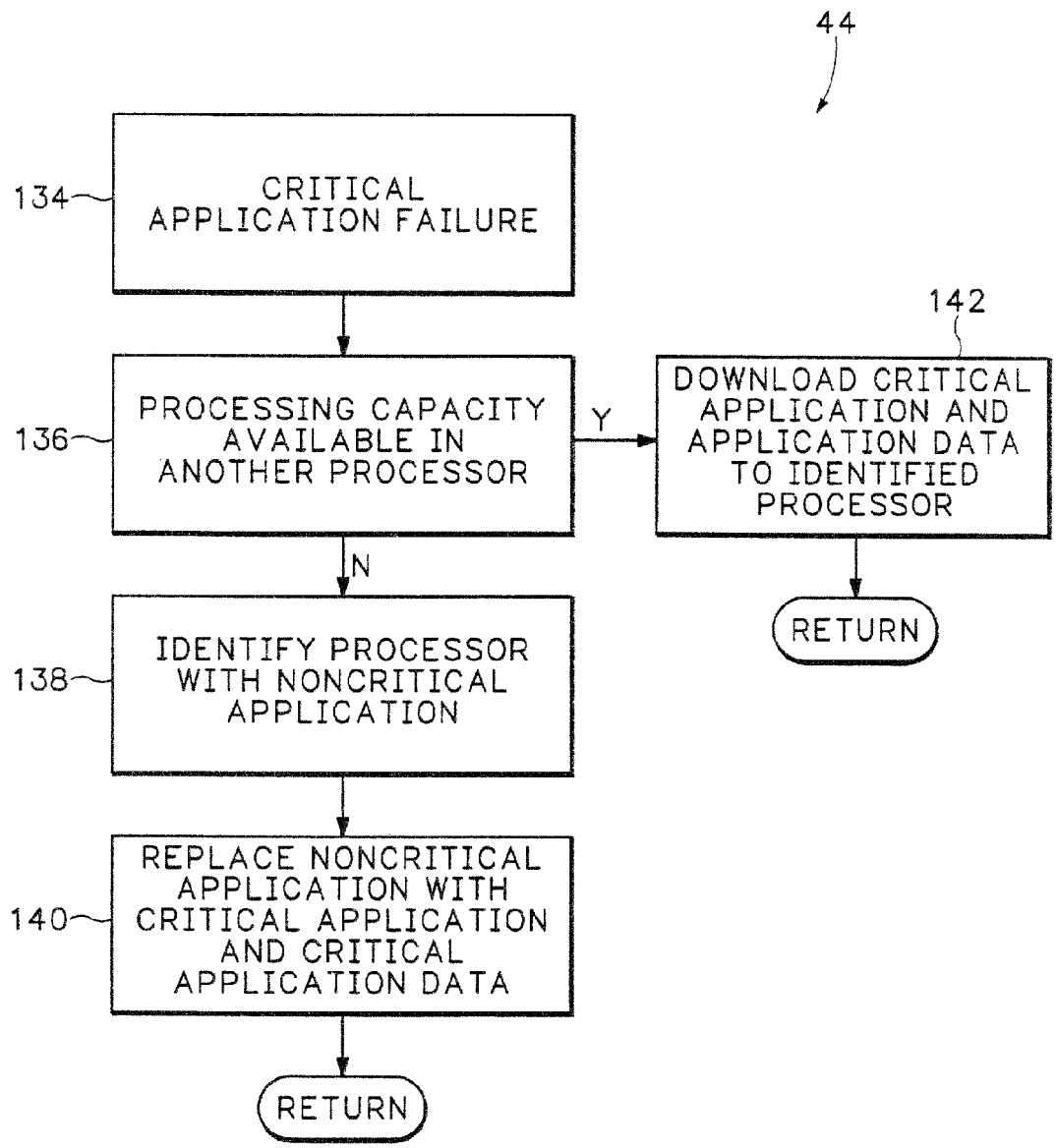

FIG. 8 shows one example of how the configuration manager 44 reconfigures the multiprocessor system when a failure occurs in a critical application, such as a failure of the ABS application 114. The configuration manager 44 for one of the processors in the multiprocessor system 8 detects a critical application failure in block 134.

One or more of the configuration managers 44 include a watchdog function that both monitors its own applications and the applications running on other processors. If an internal application fails, the configuration manager may store critical data for the failed application. The data for each application if stored in the memory 128 can selectively be encrypted so that only the car operator has the authority to download certain types of data.

The configuration manager detecting the failure initiates a reboot operation for that particular application. The application is downloaded again from memory 128 and, if applicable, any stored application data. If the application continues to lockup, the configuration manager may then initiate a reconfiguration sequence that moves the application to another processor.

Failures are identified by the watchdog functions in one example by periodically sending out heartbeat signals to the other processors. If the heartbeat from one of the processors is not detected for one of the processors, the configuration manager 44 for the processor that monitors that heartbeat attempts to communicate with the processor or application. If the application or processor with no heartbeat does not respond, the reconfiguration process is initiated.

In another example, certain processors may monitor different applications. For example, a sensor processor may constantly monitor the car speed when the car operator presses the brake pedal. If the car speed does not slow down when the brake is applied, the sensor processor may check for a failure in either the braking application or the speed sensing application. If a failure is detected, the configuration manager initiates the reconfiguration routine.

When reconfiguration is required, one of the reconfiguration managers 44 first tries to identify a processor that has extra processing capacity to run the failed application in block 136. For example, there may be a backup processor in the multiprocessor system where the ABS application 114 can be downloaded. If extra processing resources are available, the ABS application 114 is downloaded from the memory 128 (FIG. 7) to the backup processor in block 142.

There may also be data associated with the failed application that is stored in memory 128. For example, the brake commands for the ABS application 114 may have been previously identified for logging in memory 128 using a logging label described in co-pending application entitled: OPEN COMMUNICATION SYSTEM FOR REAL-TIME MULTI-PROCESSOR APPLICATIONS, Ser. No. 09/841,753 filed Apr. 24, 2001 which is herein incorporated by reference. The logged brake commands are downloaded to the backup processor in block 142.

If no backup processing resources can be identified in block 136, the configuration manager 44 identifies one of the processors in the multiprocessor system that is running a non-critical application. For example, the configuration manager 44 may identify the navigation application 110 in processor A as a non-critical application. The configuration manager 44 in block 140 automatically replaces the non-critical navigation application 110 in processor A with the critical ABS application 114 in memory 128. The processor A then starts running the ABS application 114.

Figure 9:
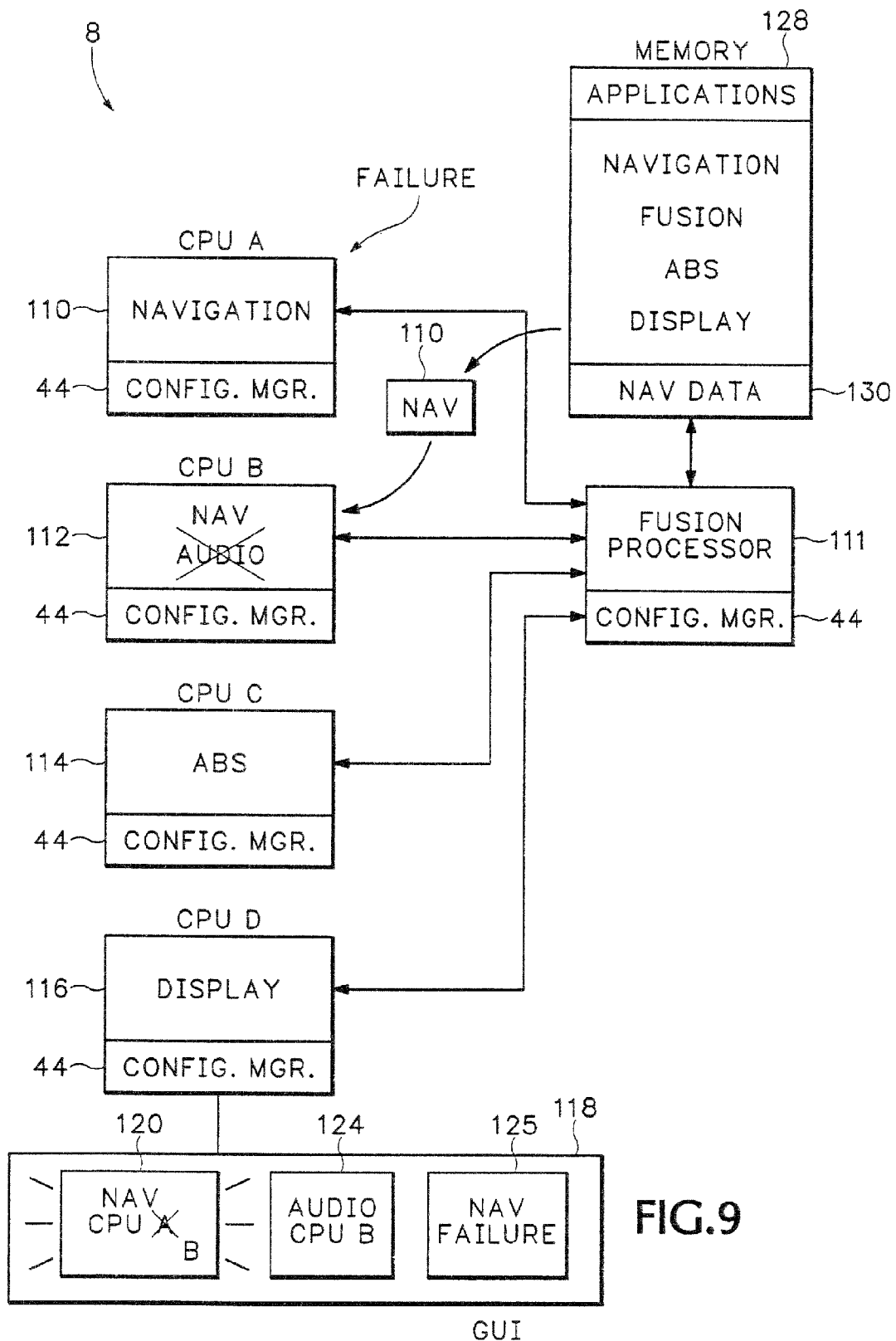
Figure 10:
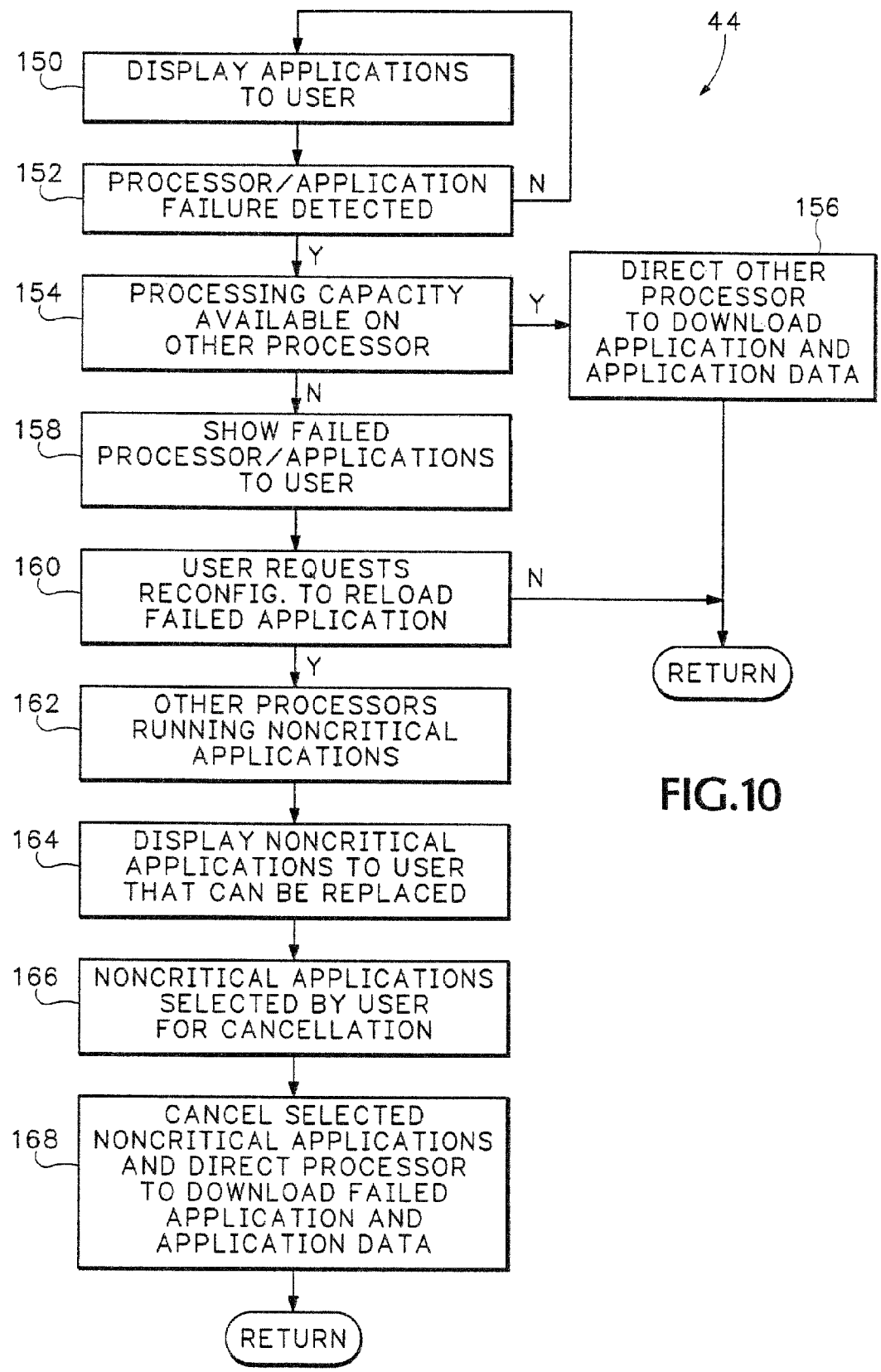

FIGS. 9 and 10 show an example of how the configuration manager 44 allows the user to control reconfiguration for non-critical applications. The applications currently running in the multiprocessor system 8 are displayed in the GUI 118 in block 150. A failure is detected for the navigation application 110 running in processor A in block 152. The configuration manager 44 in processor A, or in one of the other processors B, C, or D detects the navigation failure. Alternatively, a fusion processor 111 is coupled to some or all of the processors A, B, C and D and detects the navigation failure.

In block 154 the configuration manager 44 for one of the processors determines if there is extra capacity in one of the other processors for running the failed navigation application 110. If there is another processor with extra processing capacity, the navigation application is downloaded from memory 128 to that processor with extra capacity along with any necessary navigation data in block 156. This reconfiguration may be done automatically without any interaction with the car operator.

If there is no extra processing capacity for running the navigation application 110, the configuration manager 44 displays the failed processor or application to the user in block 158. For example, the GUI 118 in FIG. 9 starts blinking the navigation icon 120 in possibly a different color than the audio application icon 124. A textual failure message 125 can also be displayed on GUI 118.

The configuration manager in block 160 waits for the car operator to request reconfiguration of the failed navigation application to another processor. If there is no user request, the configuration managers return to monitoring for other failures. If the user requests reconfiguration, the configuration manager 44 in block 164 displays other non-critical applications to the user. For example, the GUI 118 only displays the audio application icon 124 in processor B and not the ABS application icon 122 (FIG. 7). This is because the audio application is a non-critical application and the ABS application 114 is a critical application that cannot be cancelled.

If the car operator selects the audio icon 124 in block 166, the configuration manager in block 168 cancels the audio application 112 in processor B and downloads the navigation application 110 from memory 128 into processor B. A logging manager in processor A may have labeled certain navigation data for logging. That navigation data 130 may include the last few minutes of position data for the car while the navigation application 110 was running in processor A. The logged navigation data 130 is downloaded from memory 128 along with the navigation application 110 into processor B. The navigation icon 120 in GUI 118 then shows the navigation application 110 running on processor B. At the same time the audio application icon 124 is removed from GUI 118.

Referring back to FIG. 2, a processor or application is accepted into the multiprocessor system by one or more of the device managers 46. The configuration managers 44 in the processors reconfigure the multiprocessor system to incorporate the processor or application. The data manager 42 then detects what type of data is transmitted or received by the new device and determines the different processors and input/output devices in the multiprocessor system that can receive or transmit data to the new application or processor.

Figure 11:
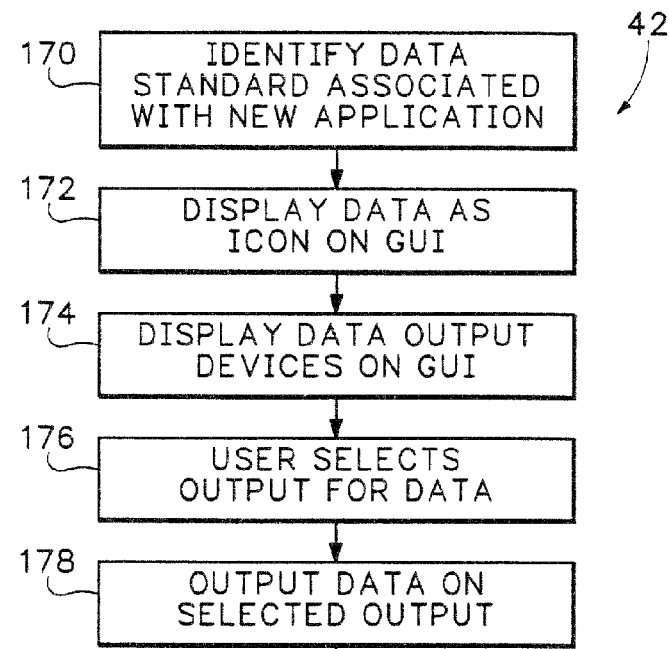
FIGS. 11 and 12 are diagrams showing how a data manager in the DC system operates.

FIG. 11 shows in further detail how the data manager 42 in FIG. 2 operates. In block 170, the data manager for one of the processors determines the data standard for the data that is either transmitted or received by a new device. For example, the new device may be a MP3 player that outputs streaming audio data. In another example, the new device may be a DVD player that outputs streaming video data in a MPEG format.

One or more of the data managers 42, identifies the device by its data and the data, if applicable, is displayed on the graphical user interface in block 172. The data manager then identifies any devices in the multiprocessor system that can output or transmit data to the new device in block 174. For example, a newly detected audio source may be output from a car speaker. The data manager monitors for any user selections in block 176. For example, the car operator may select the Output from a portable CD player to be output from the car speakers. The data manager controlling the CD player and the data manager controlling the car speakers then direct the output from the CD player to the car speakers in block 178.

Figure 12:
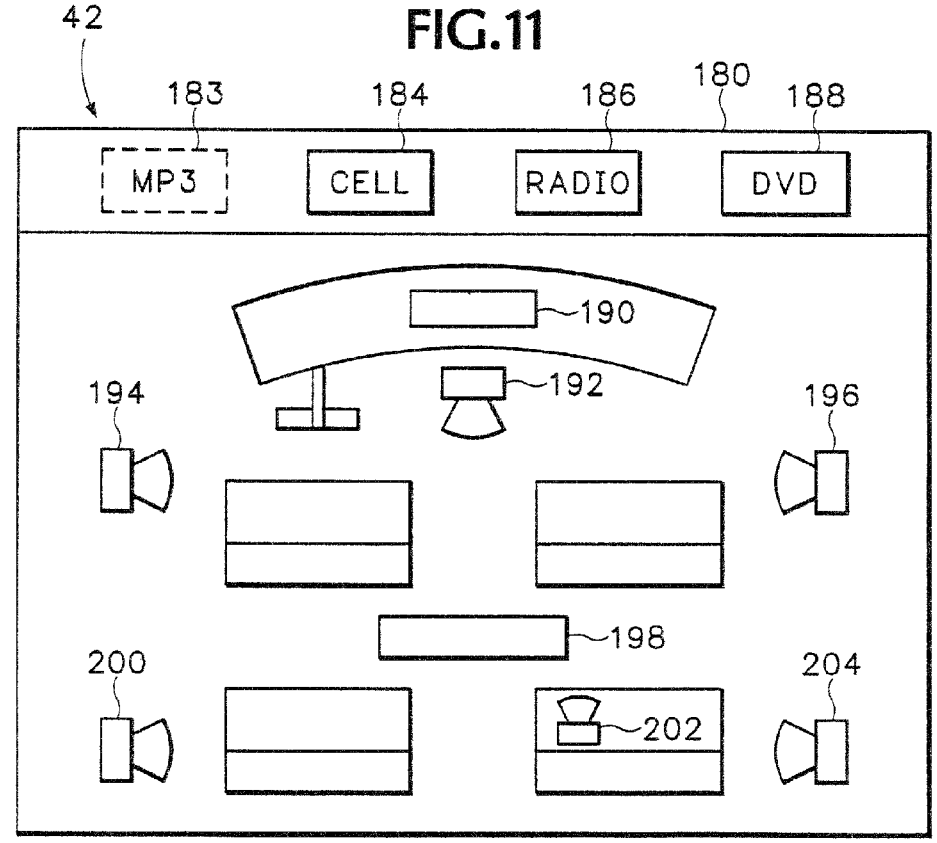

FIG. 12 gives one example of how the data managers 42 in the multiprocessing system operate. A GUI 180 displays the audio or video (A/V) sources in a car. For example, there are three devices detected in or around the car that are A/V sources. A cellular telephone detected in the car is represented by icon 184, a radio is represented by icon 186, and a DVD player is represented by icon 188.

The A/V output devices in the car are shown in the lower portion of GUI 180. For example, icons 192, 194, 196, 200, and 204 show car audio speakers. An in-dash video display is represented by icon 190 and a portable monitor is represented by icon 198.

Currently, a car operator may be listening to the radio 186 over speakers 192, 194, 196, 200 and 204. However, a passenger may move into the back seat of the car carrying an MP3 player. The MP3 player runs the DC system 10 described in FIG. 2 and sends out a signal to any other processors in the multiprocessor system 8 in the car. The device manager 46 and configuration manager 44 in one of the processors verify the data format for the MP3 player and configure the MP3 player into the multiprocessor system.

One of the data managers 42 determines the MP3 player outputs a MP3 audio stream and accordingly generates the icon 182 on the GUI 180. The data manager 42 also identifies a speaker in the MP3 player as a new output source and displays the speaker as icon 202. The car operator sees the MP3 icon 182 now displayed on GUI 180. The car operator can move the MP3 icon 182 over any combination of the speaker icons 192, 194, 196, 200 and 204. The output from the MP3 player is then connected to the selected audio outputs.

Audio data can also be moved in the opposite direction. The speaker icon 202 represents the output of the portable MP3 player that the passenger brought into the back seat of the car. The car operator also has the option of moving one or more of the other audio sources, such as the cellular telephone 184 or the radio 186 icons over the speaker icon 202. If the car operator, for example, moves the radio icon 186 over the MP3 player speaker icon 202 and the MP3 player can output the radio signals, the multiprocessor system redirects the radio broadcast out over the MP3 speaker.

Figure 13:
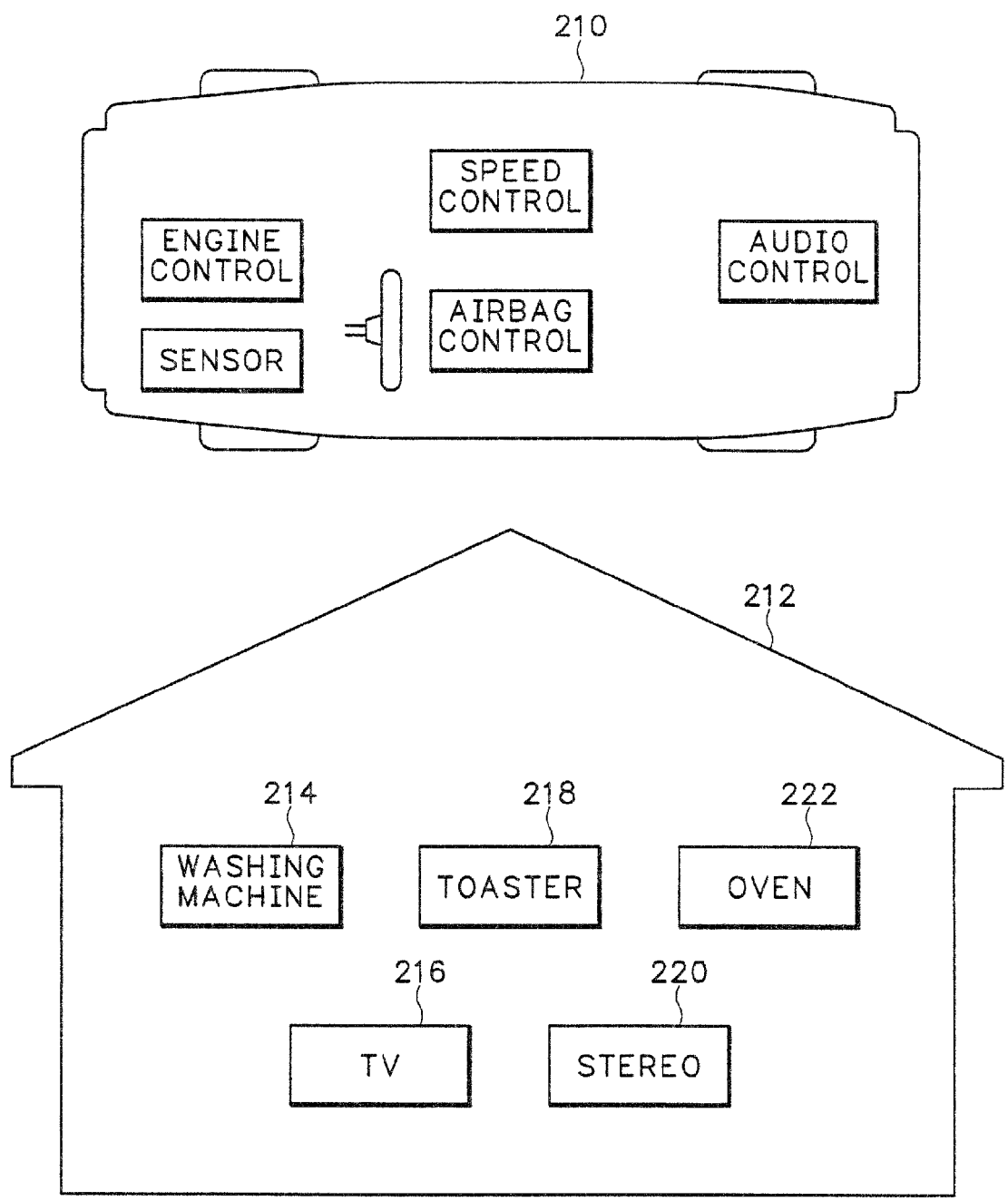
FIG. 13 is a diagram showing different multiprocessor systems that can use the DC DC system.

It should be understood that the multiprocessor system described above could be used in applications other than cars. For example, FIG. 13 shows a first GUI 210 that shows different processors and applications that are coupled together using the DC system 10 in an automobile. A GUI 212 shows another multiprocessor system comprising multiple processors in the home, For example, a washing machine is shown by icon 214. The DC system allows the washing machine processor to communicate and be configured with a television processor 216, toaster processor 218, stereo processor 220, and an oven processor 222.

The system described above can use dedicated processor systems, micro controllers, programmable logic devices, or microprocessors that perform some or all of the communication operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A system having multiple on-board processors configured to operate within a vehicle, comprising:

one or more of the multiple on-board processors coupled together through multiple links into a multiprocessor network, wherein the multiprocessor network is configured to:
operate a transceiver configured to detect and establish communication between at least one processor in the multiprocessor network and at least one new device brought into or next to the vehicle;
selectively connect the new device to the multiprocessor network;
use a data manager to identify a particular type of data used in the new device and processed with a first software application controlled and operated by the new device;
identify a second software application from among multiple different software applications located in a memory in the multiprocessor network, wherein the second software application is currently not loaded in or operated by any of the on-board processors, and the second software application is also configured to process the same particular type of data processed by the first software application controlled and operated by the new device;
using the data manager to select a particular one of the on-board processors for operating the second software application selected from the memory;
automatically move the second software application from the memory in the multiprocessor network to the particular one of the on-board processors selected by the data manager;
configure the particular one of the on-board processors to run the second software application moved from the memory, wherein running the second software application causes the particular one of the on-board processors to take over control and operation of the new device; and
initiate transfer of the data from the new device to the particular one of the on-board processors and initiate processing of the particular type of data received from the new device with the second software application running on the particular one of the on-board processors.

2. The system of claim 1 wherein:
one of the detected new devices is a data source that generates streaming audio or video data; and
the software application is configured to output the streaming audio data to an in-vehicle speaker or output the video data to a display.

3. The system of claim 1
wherein the multiprocessor network is configured to:
detect a first and second one of the new devices that generate streaming audio data;
disconnect the streaming audio data generated from the first one of the detected new devices currently connected the speakers; and
connect streaming audio data generated from the second one of the detected new devices to the speakers according to inputs received from a display coupled to the multiprocessor network.

4. The system of claim 1 wherein one of the detected new devices has an integrated display screen.

5. The system of claim 4 wherein at least a portion of content displayed on the display screen of one of the detected new devices is communicated to a display processor in the multiprocessor network for display and generation of information on a display processor display.

6. The system of claim 1 wherein one of the detected new devices includes a data storage device selected from the group of a hard disk drive, solid state device, or compact disk.

7. The system of claim 1 wherein one of the detected new devices is a wired or wireless audio output device.

8. The system of claim 1 wherein one of the detected new devices includes wireless speakers or wireless headphones.

9. The system of claim 1 wherein a data storage coupled to the multiprocessor network includes a readable and writeable data storage media selected from the group of solid state device, hard disk drive, or compact disk.

10. The system of claim 1 wherein a display processor in the multiprocessor network is coupled to an internal car radio system.

11. The system of claim 10 wherein the car radio system receives signals from multiple RF transmitters.

12. The system of claim 11 wherein the car radio system is wired to internal vehicle speakers.

13. The system of claim 1 wherein one of the detected new devices runs a global positioning system application.

14. The system of claim 1 including an external memory, and wherein one of the multiple on-board processors is configured to:
detect a data source when the new device is connected to one of the multiple on-board processors;
identify the detected data source; and
communicate the identity of the detected data source to a display processor in the multiprocessor network for indication on the display.

15. The system of claim 1 wherein a display in the multiprocessor network includes a user interface that includes a touch screen.

16. The system of claim 15 wherein the user interface initiates control operations carried out by one or more of the on-board processors in the multiprocessor network.

17. The system of claim 15 wherein the user interface generates feedback to a user of the vehicle, which feedback is derived from information displayed on the display.

18. A method for configuring multiple processors within a vehicle, comprising:
operating the multiple processors in a multi-processor system, the multiprocessor system configured to:
monitor for wireless signals from a new device not currently coupled to the multiprocessor system and moved into the vehicle, wherein the new device runs a first software application that processes a first type of data;
wirelessly connect the new device to the multiprocessor system;
identify data codes in the wireless signals from the new device and use the data codes to identify the first type of data processed by the first software application running on the new device;
responsive to identifying the data codes from the new device, select a second software application from among multiple different software applications contained within memory in the multiprocessor system, wherein the second software application is configured to process the first type of data processed by the new device;
download a copy of the second software application selected from the memory to a first one of the multiple processors in the multiprocessor system, wherein the second software application is not currently loaded in the first one of the multiple processors;
reconfigure the first one of the multiple processors in the multiprocessor system to run the second software application downloaded from the memory and take over control and operation of the new device with the second software application now running on the first one of the multiple processors; and
processing data received from the new device with the second software application operating in and controlled by the first one of the multiple processors in the multiprocessor system in the vehicle.

19. The method of claim 18 wherein the new device is an audio device, and further comprising streaming audio data from the audio device to the other one of the processors.

20. The method of claim 18 wherein the new device is a cellular telephone.

21. The method of claim 18 wherein the new device is an audio device that includes an integrated display screen.

22. The method of claim 21 further comprising a display in the vehicle, and communicating at least a portion of content displayed on the integrated display screen of the new device to the display in the vehicle.

23. The method of claim 22 wherein the display in the vehicle communicates with a vehicle radio system.

24. The method of claim 23 further comprising receiving at the vehicle radio system signals from multiple RF transmitters.

25. The method of claim 22 wherein the vehicle includes a plurality of speakers, and further comprising (i) displaying at least some of the speakers on the display in the vehicle, and (ii) operating one of the multiple processors to route audio signals from the detected audio device to selected speakers shown on the display.

26. The method of claim 22 further comprising:
operating the device manager to monitor for wireless signals from at least a second new device not currently coupled to the network;
determining whether the wireless communication interface used by the second new device is compatible with at least one protocol used in the multiprocessor system;
adding the second new device to the multiprocessor system; and
using the second new device in the mobile vehicle.

27. The method of claim 26 further comprising operating the first and second new devices to communicate with the adhoc network using Bluetooth signals.

28. The method of claim 18 wherein the new device includes a data storage device selected from the group of a hard disk drive, solid state device, or compact disk, and further comprising wirelessly communicating data from the data storage device to the other one of the processors in the adhoc network.

29. The method of claim 18 wherein the new device is a wired or wireless speaker, and further comprising communicating audio signals from one of the other processors in the adhoc network to the speaker.

30. The method of claim 18 wherein the new device comprises a global positioning device, and further comprising receiving with the global positioning device data from a satellite network.

31. A method for configuring multiple processors for operating within a mobile vehicle, comprising:
operating multiple on-board processors together as a multiprocessor system;
monitoring for wired or wireless signals from a first new device currently not coupled to the multiprocessor system, wherein the first new device runs a first software application that processes a first type of data;
responsive to detecting the signals from the first new device, selecting a second software application from among multiple different software applications contained within memory in the multiprocessor system, wherein the second software application is associated with the first type of data processed by the first new device;
downloading a copy of the second software application from the memory in the multiprocessor system to a first one of the on-board processors, wherein the first one of the on-board processor is currently not loaded with the second software application and is currently not configured to run the second software application;
configuring the first one of the on-board processors to ran the second software application;
controlling the first new device with the second software application running in the first one of the on-board processors;
streaming data from the first new device to the first one of the on-board processors;
processing the streaming data received from the first new device with the second software application running in the first one of the on-board processors;
detecting signals from a second new device currently not connected to the multiprocessor system while the first new device is currently connected to the multiprocessor system, wherein the second new device operates independently of the first new device and runs a third software application different from the first and second software application and processes a second type of data different from the first type of data;
selectively establishing a second connection between the second new device and one of the on-board processors in the multiprocessor system; and
identifying data codes in the signals received from the second new device and using the data codes to identify the second type of data processed by the third software application running in the second new device;
responsive to detecting the signals from the second new device, selecting a fourth software application from among the multiple different software applications contained within memory in the multiprocessor system, wherein the fourth software application is associated with the second type of data processed by the second new device and is not currently loaded into the first one of the on-board processors in the multiprocessor system;
reconfiguring the first one of the on-board processors in the multiprocessor system to run the fourth software application by downloading a copy of the fourth software application from the memory to the first one of the on-board processors;
controlling the second new device with the fourth software application running in the first one of the on-board processors;
streaming data from the second new device to the first one of the on-board processors;
processing the streaming data received from the second new device with the fourth software application running in the first one of the on-board processors.

32. A method of configuring processors in an onboard multiprocessor system to operate within a vehicle, comprising:
configuring a plurality of the processors to operate together as a local network
detecting wireless signals from a new device not currently coupled to the onboard multiprocessor system that comes within the vicinity of the vehicle;
reading data codes transmitted in the wireless signals indicating a type of data being processed in the new device;
determining from the data codes whether the type of data being processed by the new device is compatible with at least one protocol available in the onboard multiprocessor system;

selecting a software application from among multiple different software applications stored in memory in the onboard multiprocessor system when the data codes indicate the type of data being processed by the new device is compatible with at least one protocol available in the onboard multiprocessor system;

downloading the software application selected from the memory into a particular one of the processors in the onboard multiprocessor system, wherein the software application is currently not running in the particular one of the processors in the multiprocessor system and is configured to process the same type of data processed by the new device;

responsive to detecting the signals from the new device and determining from the data codes in the wireless signals that the data being processed in the new device is compatible with at least one protocol available in the onboard multiprocessor system, automatically reconfiguring the particular one of the processors in the onboard multiprocessor system of to switch from running a previous different software application to running the software application downloaded from memory;

configuring the particular one of the processors in the onboard multiprocessor system responsive to running the software application to take over control of the new device, receive the data from the new device, and take over processing of the data from the new device.

* * * * *